March 23, 1965
F. E. WILLIAMS
3,174,665
LUGGAGE CARRIER
Filed May 20, 1963
2 Sheets-Sheet 1
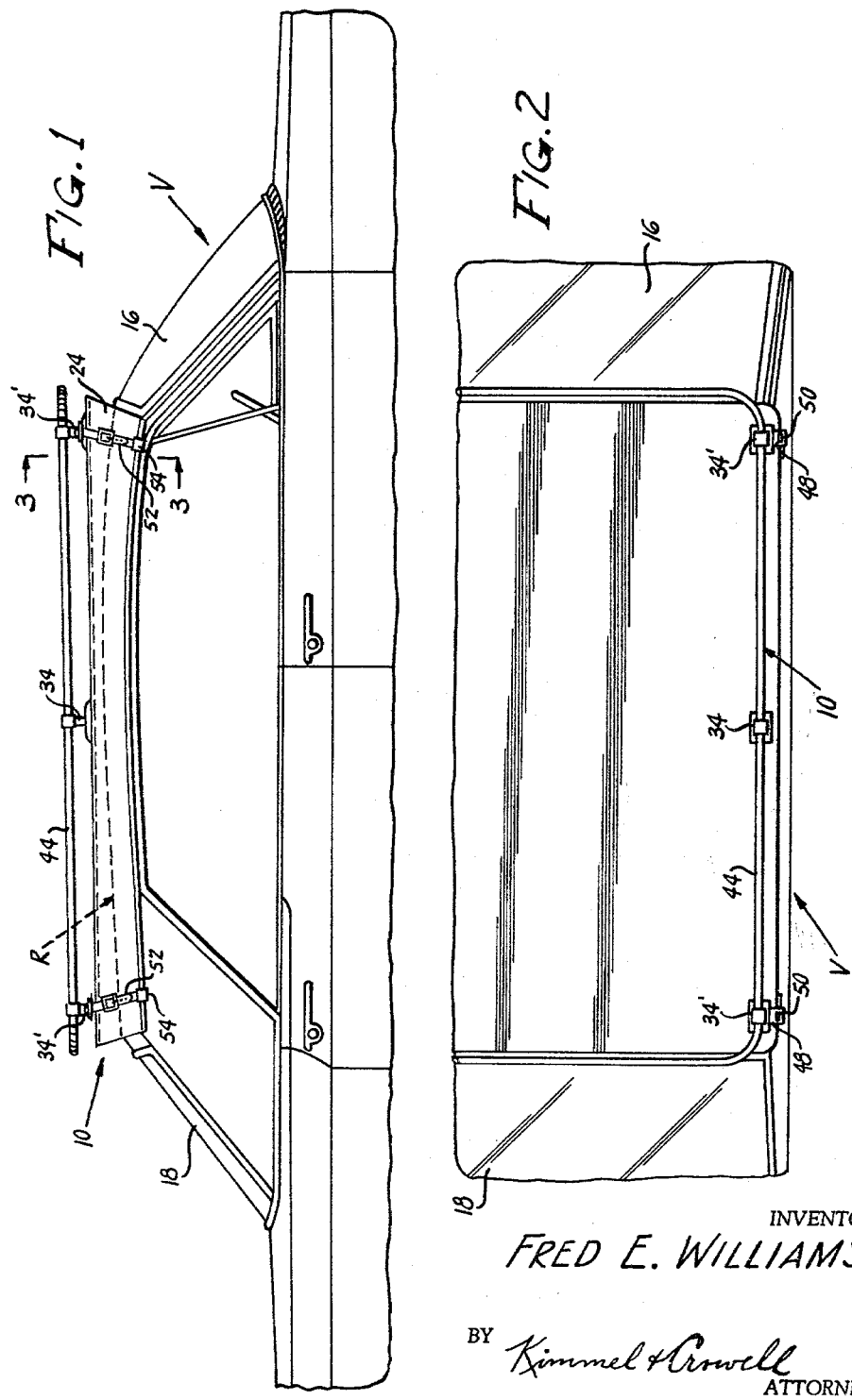
INVENTOR.
FRED E. WILLIAMS
BY Kimmel & Crowell
ATTORNEYS.

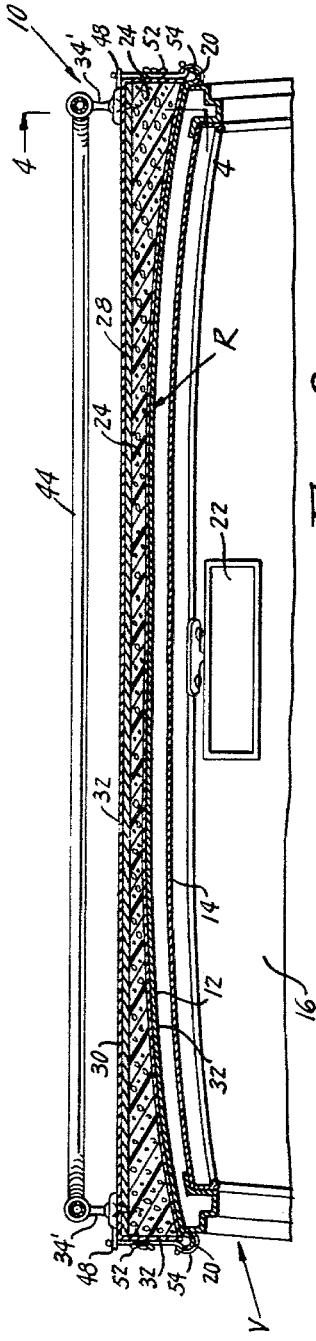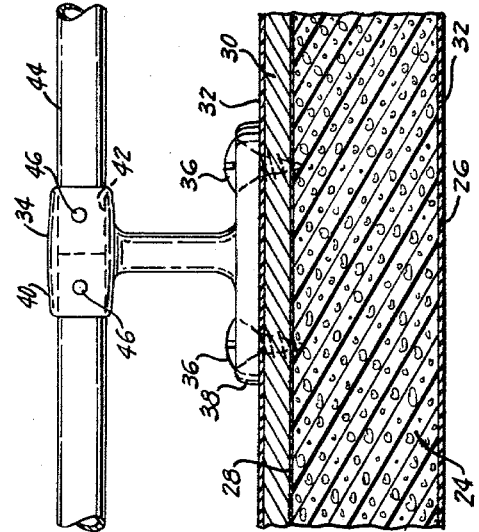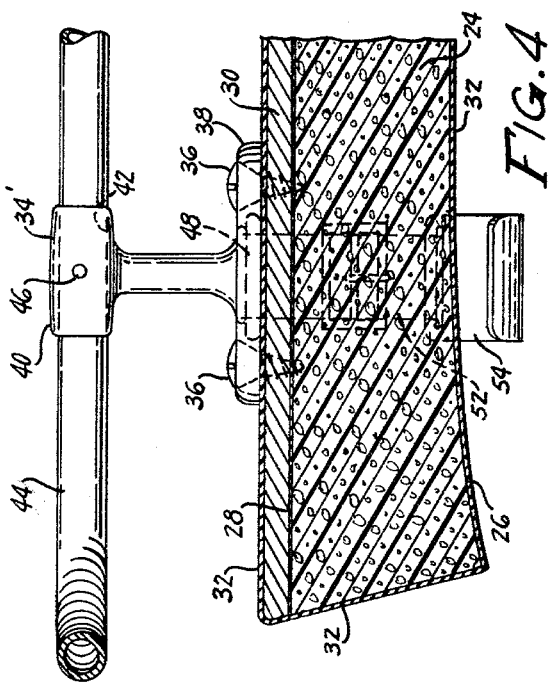
March 23, 1965 — F. E. WILLIAMS — 3,174,665
LUGGAGE CARRIER
Filed May 20, 1963 — 2 Sheets-Sheet 2
FIG. 3
FIG. 4
FIG. 5
INVENTOR.
FRED E. WILLIAMS
BY Kimmel & Crowell
ATTORNEYS.

3,174,665
LUGGAGE CARRIER
Fred E. Williams, 5805 Shenandoah Drive, Sacramento, Calif.
Filed May 20, 1963, Ser. No. 281,665
4 Claims. (Cl. 224—42.1)

This invention relates to a luggage carrier and relates more particularly to a carrier having a body portion formed of a foamed semi-rigid material with a bottom surface contoured to fit the roof of a motor vehicle on which it is to be supported.

A primary object of this invention is the provision of a luggage carrier or rack for the roof of a motor vehicle or the like having improved load bearing and other characteristics.

Another object of this invention is the provision of a carrier of the type described having a body portion formed of a foamed plastic material such as polystyrene or the like, which is light in weight and rugged in construction.

A further object of this invention is to provide a luggage carrier which will evenly distribute the weight of the articles being supported over the entire roof of the motor vehicle.

A still further object of the instant invention is the provision of a carrier for luggage or the like which will serve the additional function of insulating the roof of a motor vehicle to increase the comfort of the passengers during either hot or cold weather.

Yet another object of this invention is to provide a roof top luggage carrier for a motor vehicle which is particularly pleasing in appearance and which may be manufactured in any of a variety of designs to accommodate the particular vehicle with which it is to be utilized.

Still another object of the instant invention is the provision of an improved luggage carrier which is sturdy and durable in construction, reliable and efficient in operation, and relatively simple and inexpensive to manufacture, assemble, utilize and maintain.

Other and further objects reside in the combination of elements, arrangement of parts, and features of construction.

Still other objects will in part be obvious and in part be pointed out as the description of the invention proceeds and as shown in the accompanying drawings wherein:

FIGURE 1 is a side elevational view of the luggage carrier of the instant invention showing a portion of the motor vehicle on which the same is mounted;

FIGURE 2 is a fragmentary top plan view of the same;

FIGURE 3 is an enlarged fragmentary transverse cross-sectional view taken substantially on line 3—3 of FIGURE 1;

FIGURE 4 is a cross sectional view to a still larger scale showing one of the end stanchions taken substantially on line 4—4 of FIGURE 3; and FIGURE 5 is a view similar to FIGURE 4 showing one of the central stanchions.

Similar reference characters refer to similar parts throughout the several views of the drawings.

Referring now to the drawings in detail, a luggage carrier in accordance with the instant invention is designated generally by the reference numeral 10 and is shown as mounted on a vehicle such as an automobile, a portion of which is shown at V. The vehicle V has a roof R including an exterior wall 12 and an interior wall 14 (note particularly FIGURE 3) extending between a front windshield 16 and a rear window 18 with a rain gutter 20 extending longitudinally along each side of the roof R. A conventional rear view mirror is shown at 22.

The carrier 10 includes a body portion 24 formed of a foamed semi-rigid material, such as Styrofoam, a foamed polystyrene manufactured by the Dow Chemical Company. The body portion 24 has a bottom surface 26 substantially conforming to the configuration of the exterior wall 12 of the roof R and having substantially total contact therewith when mounted thereon. A top surface 28 of the body portion 24 has bonded thereto in any conventional manner a substantially planar platform member 30 preferably formed of plywood or the like and the assembly of the body portion 24 having the platform member 30 bonded thereto is coated with a glass-fiber reinforced plastic material 32 in which a coloring pigment may be incorporated to match or contrast with the color of the vehicle V. Any conventional plastic material, such as a polystyrene, polyethylene, or the like may be utilized for the coating 32.

Means are provided for securing luggage or the like to the carrier 10 and may be of any conventional form, one preferred embodiment being shown in the drawings as comprising a plurality of stanchions 34 formed of a nickel plated steel material or the like secured to the carrier 10 by screws 36 or the like through a base plate 38 integrally formed with the stanchions 34. Each stanchion 34 has a cross bar 40 spaced from the base plate 38 and having a horizontally extending opening 42 defined therein to receive a chrome pipe means 44 to form a continuous peripheral rack. Any number of stanchions 34 may be provided around the periphery of the carrier 10, three on each side being shown as illustrative in the drawings. As shown in FIGURE 5, the pipe means 44 may have its ends secured in one of the central stanchions by any conventional means 46.

Means are also provided for securing the carrier 10 to the vehicle V and may be of any conventional form, a preferred embodiment being shown in the drawings. Outstanding lug members 48 having slots 50 defined therein are fixed to or formed integral with at least two stanchion members 34', spaced longitudinally along each side of the vehicle V. Adjustable strap elements 52 are engaged in each of the slots 50 and carry arcuate members 54 engageable under the rain gutters 20.

The use and operation of the device of the instant invention will now be apparent. The body portion 24 has its bottom surface 26 molded during manufacture to conform substantially to the configuration of the roof R of a particular model vehicle V. The carier 10 is placed on the roof R of the vehicle V and the arcuate members 54 are engaged under the rain gutters 20 on each side with the strap elements 52 being adjusted to securely mount the carrier 10 thereon. Luggage or other such articles will then be placed on the platform member 30 within the pipe means 44 and will be secured to the pipe means 44 by ropes or belts (not shown) in any conventional manner.

It will be seen that in addition to providing extremely high load bearing characteristics and evenly distributing the weight of the load over the entire vehicle roof, the interior of the vehicle will be insulated from heat and cold by the substantially total contact of the bottom surface of the body portion of the carrier with the roof.

It will now be seen that there is herein provided an improved luggage carrier which satisfies all of the objectives of the instant invention and others, including many advantages of great practical utility and commercial importance.

Since many embodiments may be made of the instant inventive concept and since many modifications may be made of the embodiments hereinbefore shown and described, it is to be understood that all matter herein is to be interpreted merely as illustrative, and not in a limiting sense.

I claim:

1. A luggage carrier for a vehicle having a roof comprising a body portion having a bottom surface and a top surface and formed of a foamed semi-rigid material, said bottom surface being preformed to normally substantially conform to the configuration of the exterior of the roof of the vehicle, a planar platform secured to said top surface, means for securing luggage to said planar platform, and means for securing said carrier to the vehicle.

2. A structure in accordance with claim 1 wherein said foamed semi-rigid material comprises foamed polystyrene.

3. A structure in accordance with claim 1 wherein said top surface is substantially planar and is disposed substantially horizontally when said carrier is secured to the vehicle.

4. A structure in accordance with claim 1 wherein the assembly of said body portion having said platform member secured to the top surface thereof is coated with a glass-fiber reinforced plastic material.

References Cited by the Examiner

UNITED STATES PATENTS

| | | | |
|---|---|---|---|
| 2,589,772 | 3/52 | Carter et al. | 224—42.1 |
| 2,940,087 | 6/60 | Kiefer | 5—338 |
| 2,951,780 | 9/60 | Bushman | 161—160 |
| 3,038,175 | 6/62 | Faget et al. | 5—361 |

FOREIGN PATENTS 1,147,612   6/57   France.

HUGO O. SCHULZ, *Primary Examiner.*